United States Patent
Travalgia

[19]
[11] Patent Number: 6,115,843
[45] Date of Patent: Sep. 12, 2000

[54] HEADBAND WITH SLOTS FOR GLASSES

[76] Inventor: Trina Travalgia, 60 Roland Rd., Revere, Mass. 02151

[21] Appl. No.: 09/162,539

[22] Filed: Sep. 29, 1998

[51] Int. Cl.$^7$ .................................................. A42B 1/00
[52] U.S. Cl. ........................ 2/171; 2/DIG. 11; 2/209.13; 351/155
[58] Field of Search ............................ 2/10, 171, 209.13, 2/452, DIG. 11; 351/155, 156

[56] References Cited

U.S. PATENT DOCUMENTS

| | | | |
|---|---|---|---|
| 2,993,209 | 7/1961 | Monahan, Jr. | 2/14 |
| 4,712,254 | 12/1987 | Daigle | 2/452 |
| 4,811,430 | 3/1989 | Janusz | 2/452 |
| 4,852,189 | 8/1989 | Duggan | 2/452 |
| 4,856,089 | 8/1989 | Horton | 455/351 |
| 5,092,667 | 3/1992 | Bagley | 351/156 |
| 5,117,510 | 6/1992 | Broussard et al. | 2/209 |
| 5,133,596 | 7/1992 | Korny et al. | 351/158 |
| 5,278,999 | 1/1994 | Brown et al. | 2/209 |
| 5,647,061 | 7/1997 | Marcus | 2/11 |
| 5,724,119 | 3/1998 | Leight | 351/158 |

*Primary Examiner*—John J. Calvert
*Assistant Examiner*—Katherine Moran
*Attorney, Agent, or Firm*—Ernest V. Linek; Banner & Witcoff, Ltd.

[57] ABSTRACT

The present invention relates generally to headbands wearable about the head and ears of a user, and more particularly to an improved headband construction that can, if desired, easily support a pair of sun glasses or eyeglasses, using open slots, buttonholes, or the like, aligned strategically on each side of the headband, thereby providing an entrance for the arm(s) of a pair of sun/eyeglasses that will be positioned behind the headband. In a preferred embodiment, the headband further includes a thin flap of soft material attached behind the open slots that will protect the skin when the arms are slid in and to protect from exposure.

19 Claims, 2 Drawing Sheets

BUTTON HOLE

BUTTON HOLE

SEWN   UNSEWN

THIN FLAP
INSIDE BEHIND
BUTTON HOLES.

HEADBAND WITH SLOTS FOR GLASSES

BACKGROUND OF THE INVENTION

1. Field of the Invention

The present invention relates generally to headbands wearable about the head and ears of a user, and more particularly to an improved headband construction that can, if desired, easily support a pair of sun glasses or eyeglasses, using open slots, buttonholes, or the like, aligned strategically on each side of the headband, thereby providing an entrance for the arm(s) of a pair of sunglasses or eyeglasses that will be positioned behind the headband. In a preferred embodiment, the headband further includes a thin flap of soft material attached behind the open slots that will protect the skin when the arms are slid in and to protect from exposure.

2. General Background

There are a number of headbands that are commercially available, which cover and fit around a person's head, forehead, and ears to provide warmth and protection from cold weather elements. There are many uses for headbands such as skiing, biking, attending sporting events, any outdoor athletic or work activity, etc. In addition, headbands are quite convenient, popular and necessary in that they help keep a person warm & protected, they are also small, lightweight, easy to carry, pack away and wear. For these reasons, headbands are widely used. However, all of the uses mentioned in this paragraph may also demand the wearing of a pair of eyeglasses or sunglasses for corrective vision or bright light protection. However, it is very difficult and often uncomfortable to wear both an ear-covering headband and a pair of sunglasses or eyeglasses at the same time.

Many people must wear doctor prescribed eyeglasses in order to see adequately and safely, for example, it is very dangerous to ski down a trail or ride a bike without being able to read signs or see ahead well enough to maneuver when necessary and/or quickly in order to avoid disaster. A large percentage of the world's population wears prescription eyeglasses but cannot conveniently or comfortably do so while wearing a full sized headband. Even more people wear sunglasses on a bright day in order to see through blinding sunlight but again, cannot.

Full size headbands are designed to cover the head, forehead and ears which makes it nearly impossible to properly fit a pair of glasses over the wearer's ears. Eye/sunglasses are made to fit over and around the back of a human ear but with a headband on there is no simple means to access the ears. An eyeglass or sunglass wearer can however, with a headband on, force the arms of the glasses up, in, and around to fit the ear but this often causes the headband to fold back, thereby exposing the ears to the cold weather elements, which in turn, defeats the main purpose of a headband and makes for a very uncomfortable configuration along with no means of security for the glasses.

Thus there is a need for a simple straight-forward headband construction that can cover the ears of the wearer, and which further includes optional means to encompass and support a pair of the all important sunglasses or eyeglasses, particularly in a manner that can be quickly, easily, and comfortably accomplished.

3. Description of the Prior Art

It is know to support sunglasses or eyeglasses on apparatus that fits on the head of a wearer such as headbands, helmets, masks or earmuffs. Combination headband and sunglasses or eyeglass apparatuses are known to provide a more secure and easy way of wearing glasses. However, none of the following items is an attempt at combining sunglasses or eyeglasses support means with a headband for the purpose of having cold winter weather warmth & protection with an option of so easily wearing much-needed sun or eyeglasses. For example, see:

Leight, U.S. Pat. No. 5,724,119, which discloses an earmuff-eyeglass combination that consists of an earmuff assembly and an eyeglass assembly, where the eyeglass assembly includes an eyeglass with opposite sides and a pair of temple bar devices, and where each temple bar device has a rear end pivotally mounted on said earmuff assembly and has a front end coupled to a corresponding side of said eyeglass, wherein: each of said temple bar devices includes a plurality of bars, including a first bar having a rear end pivotally connected to said earmuff assembly and having a front end lying forward of said rear end, and a second bar having a rear end pivotally connected to said front end of said first bar and having a front end which lies forward of said second bar rear end and which is pivotally coupled to a corresponding side of said eyeglass, whereby to enable adjustment of the forward-rearward position of the eyeglass.

Marcus, U.S. Pat. No. 5,647,061, which discloses a headband having eyeglass securing means consisting of a continuous band of elastic material having an inner surface intended for circumferential fitting engagement with the head of a wearer and an outer surface opposite said inner surface, said inner and outer surfaces being defined by top and bottom edges; and eyeglass securing means for selectively attaching a pair of eyeglasses worn by said wearer to said band, said eyeglass securing means comprising an elongated strip of flexible material having a first end fixed to said band, and a second end releasably attachable to said band, said strip having a length sufficient t form a loop about a nose bridge of said eyeglasses when said second end is attached to said band, said strip including a hook and catch fastener portion at said second end, and said inner surface of said band including a hook and catch fastener receiving portion aligned above said first end for releasable attachment of said second end thereto.

Forsyth, U.S. Pat. No. 5,278,999, which discloses a combined ear and eye protection device consisting of a pair of ear muffs each having an exterior housing and interior sound absorbing material, each said muffs adapted to fit over one ear of the user; a headband adjustably attached at each end to one of said ear muffs and adapted to fit over the head of the user; and eye protector glasses having a front frame and two side templates wherein each template is attached at one end to said frame and pivotally attached at its other end to the interior of said ear muffs and said frame being removable from at least a portion of each said template permitting the substitution of alternate frames, said templates including means for horizontal adjustment independently of said pivotal attachment to said ear muffs; wherein each ear muff includes a top frontal quadrant and said pivotal attachment of said templates being located within said quadrant.

Holmes, U.S. Pat. No. 5,133,596, which discloses an eye and hearing protection member consisting of means for protecting eyes and means for protecting hearing, said eye protecting means being selected from the group consisting of a goggle and a spectacle, each one including a frame means and at least one lens affixed thereto, the frame means including integrated reinforcement means whereby said reinforced frame means remains substantially rigid and without substantial deformation during normal use of the safety unit; the hearing protection means including a pair of earcups; a pair of arm members adapted to cooperate with and extend from the respective opposed temple regions of the reinforced frame means by way of mutually complimentary engageable coupling means of releasable snap-fit type, which coupling means are disposed at one end of the respective arm members and at laterally spaced positions of the reinforced frame means, which arm members carry at their ends a respective one of the earcups and where the arm members resiliently react against the substantially rigid frame means to hold the earcups to the side of a wearer's head in use and which receive the earcups in a manner to provide adjustability on an inclined plane to account for facial asymmetry, the mounting of the lens being isolated from the resilience of the arms by the provision of the frame reinforcement means.

Brousseau, U.S. Pat. No. 5,117,510, which discloses a headband construction for supporting a flashlight consisting of (a) a circular headband having inner and outer wall surfaces and upper and lower band edges; (b) at least the outer wall surface having a pair of buttonholes extending generally vertically between the upper and lower band edges and spaced along the band from front to rear, including a forwardly positioned buttonhole and a rearwardly positioned buttonhole which are closely spaced apart so that a small flashlight can be supported by the headband when inserted respectively through the pair of buttonholes; and (c) the headband having a portion generally between he forward and rear button holes that defines a strip of headband material that covers and engages the flashlight along its length during use.

Bagley, U.S. Pat. No. 5,092,667, which discloses a combination eyeglass retainer and ears protector, comprising an adjustable two-piece headband having tubular members for receiving and holding the temples of a pair of eyeglasses threaded therethrough, and wherein the tubular members hook over the user's ears when the eyeglass retainer is emplaced in operable position on a user's head, and wherein the eyeglasses are firmly retained in position due to the tubular members being snugly emplaced between the headband pieces and the user's head.

Horton, U.S. Pat. No. 4,856,089, which discloses a combined eye covering and ear covering assembly consisting of a resilient, hard, stiff, nonelastic, arcuate, non-encircling elongated head band structure which is adapted to be positioned at an angle above the eyes and across a forehead of a wearer and which is constructed to extend only part way around the head of a wearer from one ear forwardly across the forehead to the other ear and not behind the head or over the top of the head of the wearer, said band structure having a hard, inelastic center portion which is adapted to be positioned over the middle of the forehead of the wearer and above the nose of the wearer and first and second hard, inelastic, but flexible end portions each having a free end which is arranged to extend to a position adjacent one ear, each end portion including a band made of rigid but flexible spring material and coupled at an inner end thereof, opposite said free end, to said center portion of said band structure, first and second ear coverings mounted, respectively, to one of said band structure end portions adjacent said free end thereof, adjusting means for adjusting the position of said ear coverings on said band end portions, said center portion of said band structure including rigid mounting means centrally located over the wearer's forehead for mounting an eye covering, and an eye covering mounted to said mounting means.

Duggan, U.S. Pat. No. 4,852,189, which discloses a headband structure consisting of a continuous elastic headband having moisture absorptive properties and textured to present a larger plurality of upstanding fibrous loops, the improvement which compresses a rimless relative thin one-piece preformed flexible thermoplastic eyeglass member of generally wraparound configuration having a central body portion and integral rearwardly directed tapered wing portions to substantially entirely shield the eyes from sun rays and the intrusion of foreign objects, and means adhesively secured to the body and wing portions of said eyeglass member along the upper inner marginal portions thereof and presenting fibrous hooks outstanding therefrom for cooperative releasable engagement with the upstanding loops of the textured continuous elastic headband along the outer exposed surface thereof, said eyeglass member thereby being readily invertible by rotation through an angle of about 180 degrees from an active line of sight position on said headband depending downwardly thereon to an active out of line sight position on said headband extending upwardly thereon in releasable engagement therewith.

Janusz, U.S. Pat. No. 4,811,430, which discloses an eye shield and headband combination, wherein a frameless optical eye shield is used with a moisture-absorbent headband. The eye shield is a transparent sheet having one of a pair of loop-and-pile fasteners adhered to the upper margin of its outer surface. The headband has a pocket attached to its inner surface and also the other of said fasteners adhered to the lower margin of its inner surface. The eye shield may be stored in the pocket when it is not in use, and is attached to the headband with the fasteners when it is in use.

Daigle, U.S. Pat. No. 4,712,254, which discloses a headband and eyepiece combination, comprising a headband element which is receivable on the head of a wearer and has an open pocket formed therein, an eyepiece which is receivable in the pocket and a mounting assembly for mounting the eyepiece on the headband element. The eyepiece is mounted on the headband element so that it is alternatively positionable in a retracted first position wherein it is received in the pocket for use of the device as a conventional headband or an operative second position wherein it extends from the headband element for use of the device as a headband and eyeglass combination.

Monahan, U.S. Pat. No. 2,993,209, which discloses a diving face mask structure consisting of a hollow casing having a transparent front and wall secured thereto and an open rear end, the rear edges of said casing being dimensioned and shaped to be adapted to fit over the eyes and nose and conform to the contours of the face of a wearer in fluid sealing engagement therewith, a pair of aligned openings formed on the side walls of said casing adapted to receive the temples of a pair of glasses of a wearer adjacent the frames, a hollow rearwardly extending tube having its forward end secured to said casing about the periphery of each opening in fluid seating engagement with said casing, the free rear ends of said tubes being sealed, said tubes being of sufficient length and diameter to receive the temples of a pair of glasses positioned within the casing and worn by the wear of said mask.

Each of the patents described above suffer certain drawbacks, including the following: most fail to teach or suggest a cold weather headband which encircles the head, including the forehead and ears. More importantly, none of these patents provide means for wearing a pair of conventional sunglasses or eyeglasses with a headband, in a manner that is easy to use.

Accordingly, the headband of the present invention is designed to keep the user's head, forehead and ears warm and also provides convenient means to accept and retain a pair of sunglasses or eyeglasses comfortably, effortlessly and securely. This new and useful invention will significantly enhance a user's performance and enjoyment while being able to wear both a warm & protecting headband and a pair of much needed eye/sunglasses.

SUMMARY OF THE INVENTION

Therefore, it is an object of the present invention to provide a cold weather headband with means and option for reasonably fitting a pair of sun or eyeglasses that is simple to apply and which does not require the use of excess material, adhesives, straps, tools of even more than a single hand.

It is another object of the present invention to provide a headband with means and option of reasonably fitting and supporting a pair of sun or eyeglasses therethrough, which is greatly economical to produce.

It is a further object of the present invention to provide a headband with means and option for fitting a pair of sun or eyeglasses therethrough, which may be worn by a large percentage of the population.

Moreover, the present invention to provide a headband with means and option for fitting a pair of glasses therethrough will allow users to perform better and more importantly, safely.

In accordance with the preferred embodiment of the present invention, a stretchable fleece-like headband is provided with two slots or buttonholes on each side aligned strategically at temple's location. The slots (or button holes) can have any desired shape, e.g., tear drop, square, round, diamond, triangle, etc., so long as they are sized sufficiently so that any size sunglasses or eyeglass arm will slide through with only minimal resistance.

Advantageously, behind both slots and buttonholes there is included a thin soft flannel-like material that is stitched in a semi-circle fashion to which will allow an opening at one end (closest to the ear). This thin flannel-like material is to protect the skin from the arms of a pair of glasses and from exposure to the weather elements. If desired, this added material can be formed into a channel, open at the back end (near the ear) to allow the arm of the glasses to pass through and loop around the ear, but otherwise providing a narrow pathway for the arms of the glasses to pass through.

To use the headband of the present invention, the user should simply stretch, fit and position the improved headband over the head as usual. Then slide the arms of a pair of sun glasses or eyeglasses back into the buttonholes and behind the ear(s). To remove, simply pull the sunglasses or eyeglasses forward and away from the face as normal; remove headband by pulling upward from the head.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE INVENTION

Referring to FIGS. 1–5, the headband of the present invention is advantageously formed into a continuous band, fabricated from a fleece-like material which is stretchable and comprises continuous top and bottom generally parallel edges and which define an inner surface intended for circumferential fitting engagement with the head of the wearer and outer surface opposite inner surface.

As illustrated, the headband has two slots or buttonholes sewn-in and aligned on both sides at temples location that create an opening that is sized large and long enough to generously welcome the arms of a pair of sun or eyeglasses. Behind each buttonhole opening is optionally a soft thin flannel-like fabric that is sewn in a semi-circle fashion so that one end, the one closest to the ear, is open to allow passage of sunglasses or eyeglass arm(s) from the outside/other side. This fabric protects the skin by preventing airflow from the holes and also assists in retaining the arms of the glasses.

Figure 1:
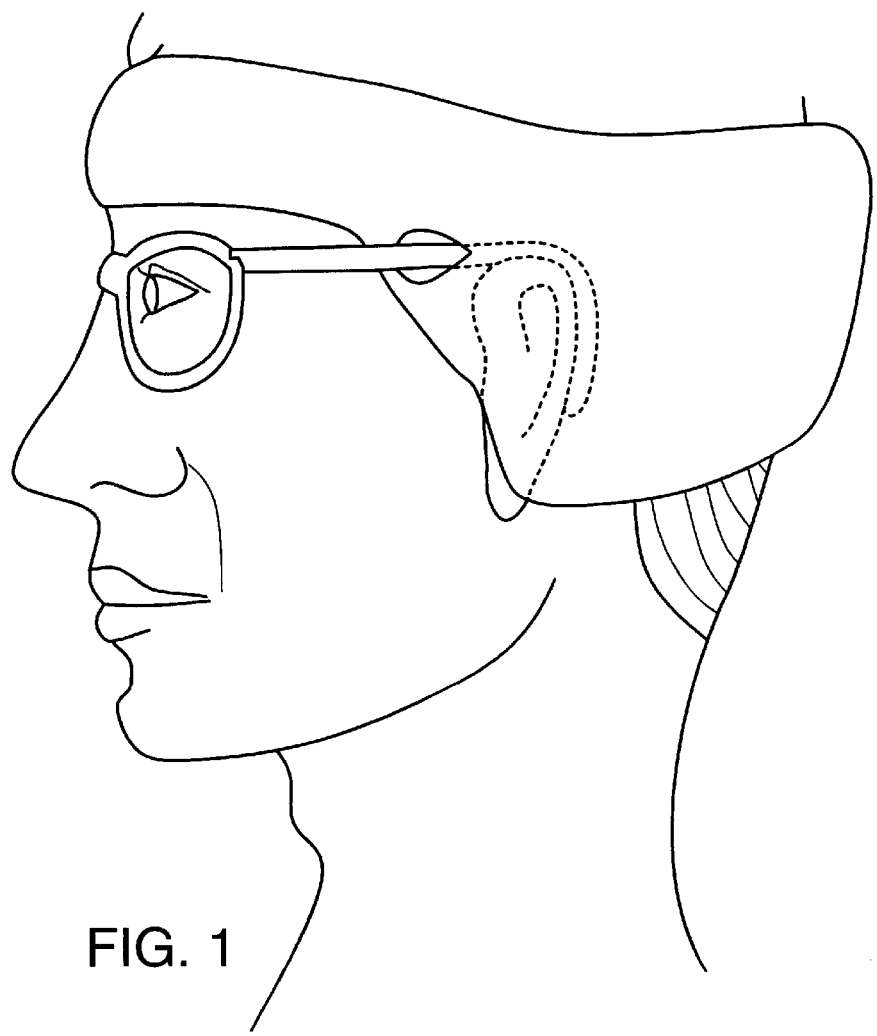
FIG. 1 is a side perspective view of an improved headband with a pair of sunglasses or eyeglasses worn by a wearer.
Figure 2:
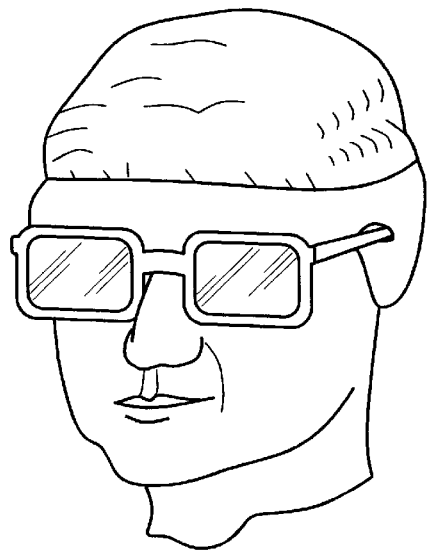
FIG. 2 is a frontal perspective view of an improved headband with a pair of sunglasses or eyeglasses worn by a wearer.

Referring to FIGS. 1 and 2 but more particularly FIG. 1, the improved headband is shown with a pair of sunglasses or eyeglasses combined on a person's head. The ends of each arm of the glasses are inserted into and behind the headband via the slots or buttonholes on the headband. The slots or buttonholes sized to welcome the sunglass or eyeglass arms easily and without force or difficulty. The arm(s) of the glasses slide behind the headband and encircle behind the ear(s) as normal and sit upon the bridge of the nose as normal.

Referring to FIG. 2, the improved headband is shown combined with a pair of glasses on a wearer's head from a frontal perspective. The headband is encircled around the head and a pair of sunglasses or eyeglasses is fitted through the buttonholes and upon the bridge of the nose as normal. From this perspective the forehead, back of the head and ears are covered behind the headband as well as part of the arms of the sunglasses or eyeglasses, which are behind the headband and around the ears.

Figure 4:
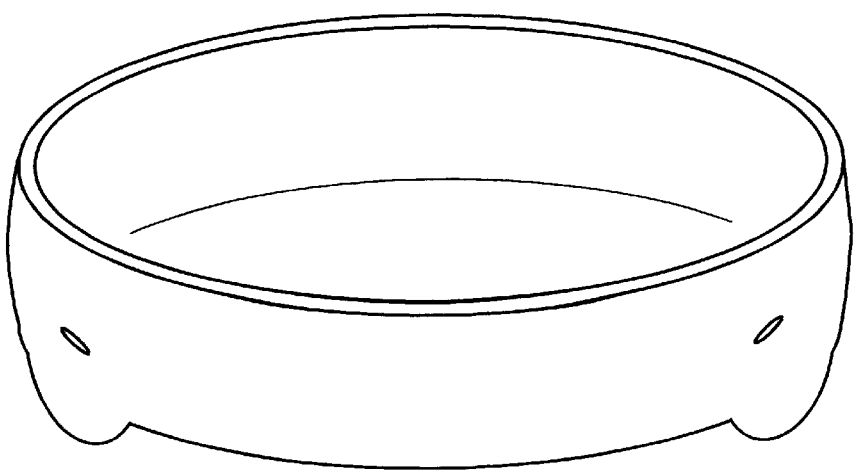
FIG. 4 is a frontal perspective view of an improved headband by itself.
Figure 3:
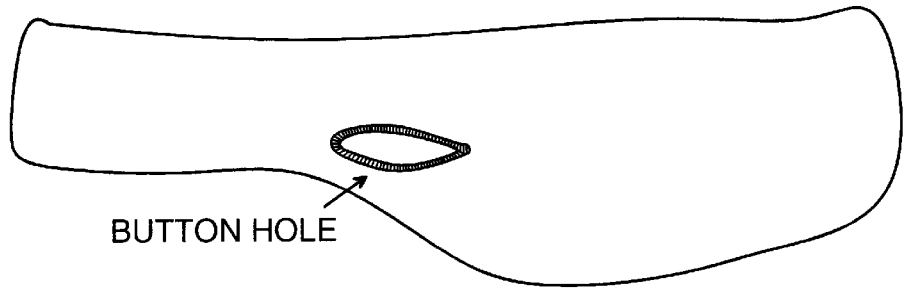
FIG. 3 is a side perspective view of an improved headband by itself.
Figure 3A:
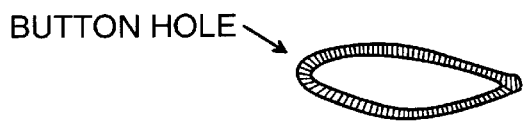
FIG. 3A shows the button hole of FIG. 3 in close-up.

Referring to FIGS. 3, 3A and 4, the improved headband is displayed without a pair of sunglasses or eyeglasses or fitted around a head of a wearer. In FIG. 3 the buttonhole is shown from this side view. FIG. 3A shows the buttonhole up close and in FIG. 4, the two buttonholes are seen from this frontal view.

Figure 5:
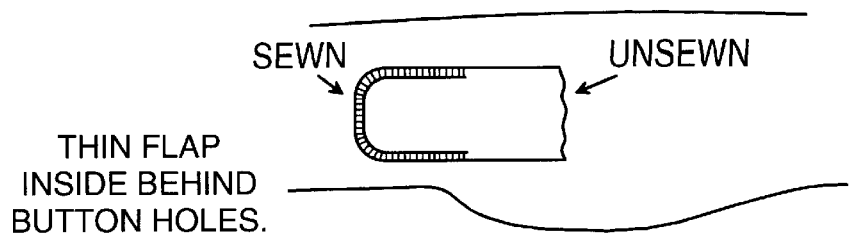
FIG. 5 is a view of the inside or reverse side of the improved headband displaying the protective strip of material behind the buttonholes.

Referring to FIG. 5, the improved headband is displayed inside out (or in reverse) to display and expose the thin strip or flap of the soft flannel-like protective material that is located behind the buttonhole(s). This small piece of material is sewn just beyond the boarders of the buttonhole with one end of the flap left un-sewn, at the side closest to the ear, so the there is a passage way for the arms of a pair of glasses (75% sewn, 25% un-sewn).

A wearer of the headband of the present invention can quickly and easily wear a pair of sun or eyeglasses with the improved headband by sliding the arms of the sunglasses or eyeglasses through the buttonholes and adjust up the bridge of the nose as normal. To remove sunglasses or eyeglasses and headband, pull the glasses forward away from the face as normal so that the arms are dislodge from behind the ears and out from behind the buttonholes and headband then pull the headband upward from head.

Other materials that may be used to form the headband of the present invention are well-known in the art; for example, as shown in FIG. 4A, the headband can be formed as a sandwich from one or more materials having an elastomeric core and a fabric on each side of said core. The core can be, for example, neoprene, rubber, or the like.

The outside fabric can advantageously be a water repellant or waterproof material such as mylar, nylon or the like, while the inner fabric is preferably a moisture absorbing material and/or a heat retaining material, such as wool, cotton, terry cloth, Malden Mills' Polartec® fleece, or the like. If added warmth is desired, insulating materials can be used—such as 3M's Thinsulate®, or like materials. The skilled artisan can readily fabricate the headband of the present invention using these and other readily available materials.

Outside fabrics can be chosen to reflect the current fashions of the intended users, particularly downhill skiers, who commonly wear brightly colored garments, in neon, fluorescent, and similar vivid colors. Snowboarders on the other hand, tend to forego the bright colors favored by downhill skiers, and the outer fabrics for these users would include camouflage patterns, black, and earth tone colors. Advertising (e.g., ski slopes, manufacturers, etc.) can be included on the outside fabric if desired. If desired, the headband can be made reversible, allowing the wearer the option of showing different outer materials.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. An improved cold weather headband consisting of two spaced apart slots adapted to accept the arms of sunglasses or eyeglasses said headband comprising a continuous loop or band of stretchable material, sized sufficiently to cover at least the ears of a user.

2. The headband of claim 1, wherein the arm accepting slots comprises two sewn-in buttonholes placed at the temples, said buttonholes adapted to be sized sufficiently to accept the arms of a pair of sunglasses or eyeglasses.

3. The headband of claim 2, wherein behind each button hole opening there is further provided another section of fabric that is sewn in a manner that aids in the retention of the glasses.

4. The headband of claim 1, wherein said headband is adapted to encircle the head of the user wherein said headband conforms closely to the forehead and ears of the user.

5. An improved cold weather headband with a pair of spaced apart slots adapted to accept the arms of sunglasses or eyeglasses said headband comprising a continuous loop or band of stretchable material, sized sufficiently to cover at least the ears of a user;

wherein the stretchable material is fashioned as a sandwich from at least one material having an elastomeric core and a fabric on each side of said core.

6. The headband of claim 5, wherein the elastomeric core is fashioned from neoprene.

7. The headband of claim 5, wherein the elastomeric core is fashioned from rubber.

8. The headband of claim 5, wherein the fabric on at least one side is mylar.

9. The headband of claim 5, wherein the fabric on at least one side is nylon.

10. The headband of claim 5, wherein the fabric on at least one side is wool.

11. The headband of claim 5, wherein the fabric on at least one side is cotton.

12. The headband of claim 5, wherein the fabric on at least one side is fleece.

13. The headband of claim 5, wherein the fabric on at least one side is flannel.

14. The headband of claim 5, wherein the fabric on at least one side is a neon color.

15. The headband of claim 5, wherein the fabric on at least one side is an earth tone color.

16. The headband of claim 5, wherein two fabrics suitable for use as the outer fabric are employed on each side, making the headband reversible.

17. The headband of claim 16, wherein the fabric on at least one side includes advertising indicia.

18. The headband of claim 16, wherein the fabric on at least one side is a neon color.

19. The headband of claim 16, wherein the fabric on at least one side is an earth tone color.

* * * * *